United States Patent [19]
Fowler et al.

[11] Patent Number: 6,052,129
[45] Date of Patent: Apr. 18, 2000

[54] METHOD AND APPARATUS FOR DEFERRED CLIPPING OF POLYGONS

[75] Inventors: Mark Christopher Fowler, Colchester; Kirk Steffen Haskell, Essex Junction; Robert Spencer Horton, Colchester, all of Vt.; Thomas Yu-Kiu Kwok, Washington Township, N.J.; Chandrasekhar Narayanaswami, Wilton, Conn.; Bengt-Olaf Schneider, Yorktown Heights, N.Y.; Mark Van Horn; James Lewis van Welzen, both of Raleigh, N.C.

[73] Assignee: International Business Machines Corporation, Armonk, N.Y.

[21] Appl. No.: 08/942,078

[22] Filed: Oct. 1, 1997

[51] Int. Cl.[7] .................................................. G06T 15/30
[52] U.S. Cl. .......................................... 345/434; 345/506
[58] Field of Search .................................... 345/434, 118, 345/506

[56] References Cited

U.S. PATENT DOCUMENTS

| | | | |
|---|---|---|---|
| 4,885,703 | 12/1989 | Deering | 345/434 |
| 4,888,712 | 12/1989 | Barkans et al. | 345/118 |
| 5,208,909 | 5/1993 | Corona et al. | 345/506 |
| 5,357,599 | 10/1994 | Luken | 345/434 |
| 5,455,897 | 10/1995 | Nicholl et al. | 345/434 |

*Primary Examiner*—Mark K. Zimmerman
*Assistant Examiner*—Kimbinh T. Nguyen
*Attorney, Agent, or Firm*—Douglas W. Cameron; Anne Vachon Dougherty

[57] ABSTRACT

While executing the standard graphics processing steps, problem polygons (i.e., those outside of a defined clip volume) are buffered for later processing, while the standard graphics processing continues, without the need for periodically reformatting data and performing clipping. After either a predefined number of polygons have been stored at the buffer location, or at such time as a change in the rendering state occurs, the buffered polygons are clipped.

33 Claims, 9 Drawing Sheets

METHOD AND APPARATUS FOR DEFERRED CLIPPING OF POLYGONS

FIELD OF THE INVENTION

This invention relates to computer graphics rendering systems and more specifically to a method and apparatus, utilizing a single instruction multiple data computer, for streamlining the processing of images which require clipping of convex polygons.

BACKGROUND OF THE INVENTION

Figure 1:
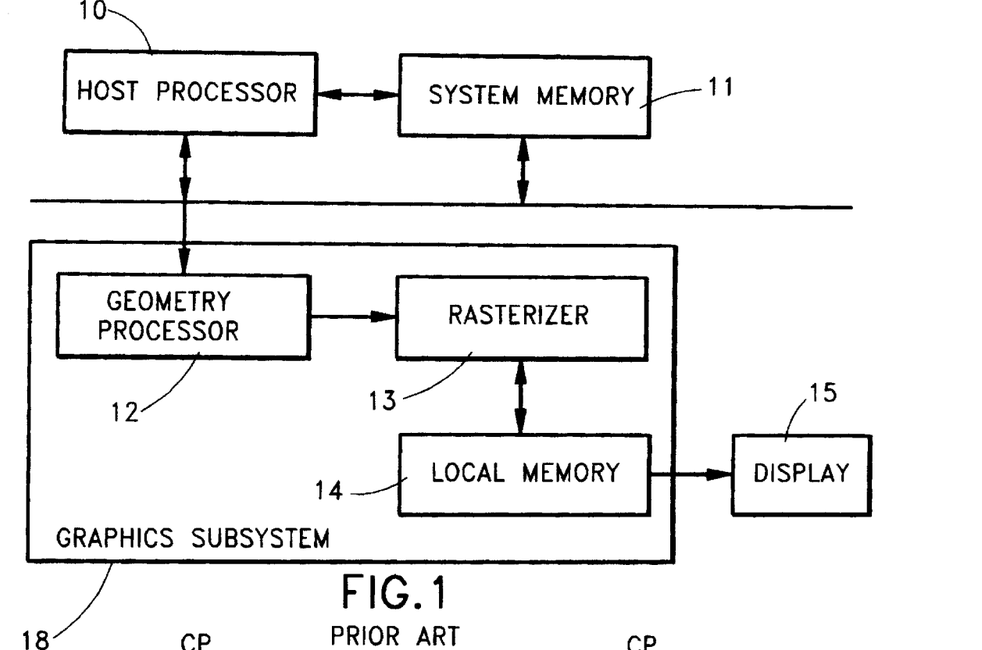
FIG. 1 provides a schematic illustration of the apparatus used for converting input image information into three-dimensional computer graphics.

In the art of computer graphics, rendering of a primitive into an image in a three-dimensional graphics system requires a series of transformation steps. Generally, the Host Processor 10, of a system of the type illustrated in FIG. 1, will retrieve information describing the primitive from the System Memory 11 and provide same to the Graphics Subsystem 18. In the Graphics Subsystem, the Geometry Processor will perform a number of operations on the retrieved information in order to convert the information into a three-dimensional computer graphic. Once the geometry operations have been completed, the resulting representation of the image is rasterized in Rasterizer 13 and stored in the Local Memory 14 until it is read out of the Local Memory for display at Display Monitor 15. The series of geometric transformation operations include operations shown in the representative process flow of FIG. 2.

Figure 2:
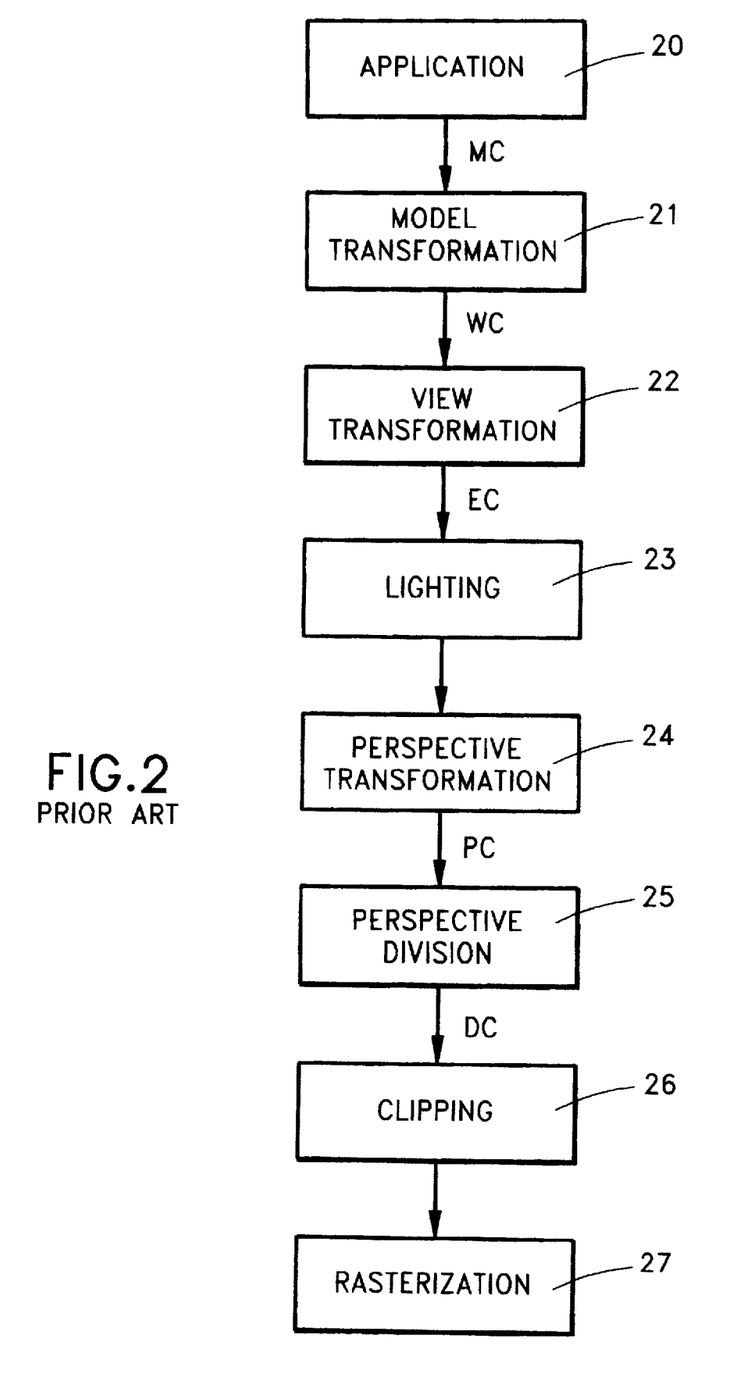
FIG. 2 provides a representative process flow utilized for converting input graphic information into three-dimensional computer graphic images.

FIG. 2 shows that the original graphic information, described by application 20 in model coordinates, is first transformed from model coordinates into world coordinates via the Model Transformation step 21, whereby transformation matrices are applied to the primitive's coordinates, thereby transforming it into a unified coordinate system describing the position of all objects in the scene, referred to as world coordinates. At step 22, the primitive's world coordinates are further processed in the View Transformation step to render the image in eye coordinates, as if viewed from a single vantage point, with the human eye as the point of origin of the coordinate system.

The primitive in eye coordinates is next operated on in a way to add lighting and color to the coordinates, in the Lighting step 23. To this point in the graphics rendering process, all of the operations have simply been done on the Cartesian coordinates. In the Perspective Transformation step 24, the space is transformed into a box, such that the shape of the view volume is transformed to a normalized view volume in which the view plane is located at z=D and the eye at z=0. Perspective coordinates are then mapped into device coordinates in the Perspective Division step 25, yielding device coordinates which can be rasterized for display. The Rasterization processing breaks the display space down into pixels which must be set to the primitive's color where image components are present, and pixels which must be turned off, in image background areas.

Figure 3:
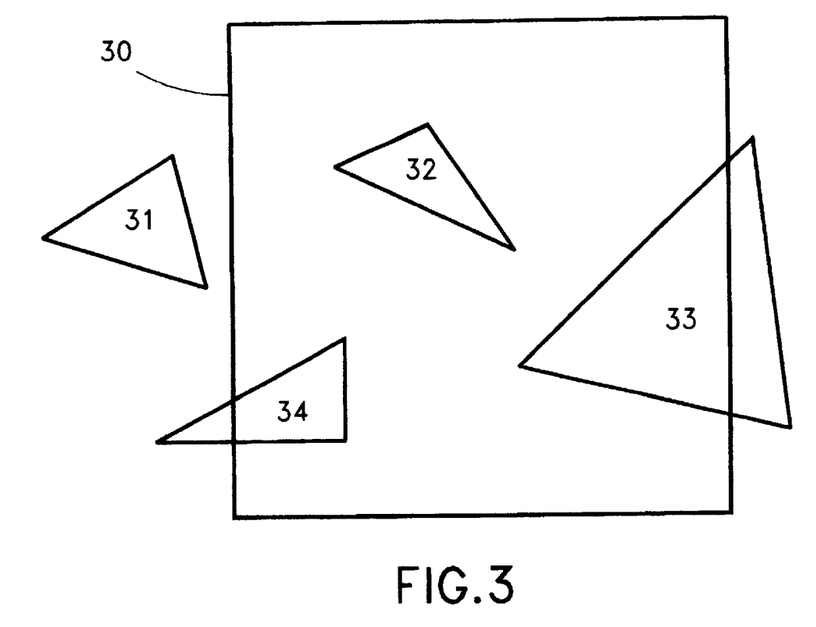
FIG. 3 provides a schematic illustration of the view fustrum 30 with several objects inside and outside of its boundaries.

After converting the image information into device coordinates, it is necessary to clip the image with respect to the view fustrum (i.e., field of view). Clipping is performed as step 26 prior to Rasterization at step 27. FIG. 3 provides a schematic illustration of the view fustrum 30 with several objects inside and outside of its boundaries. Under the prior art processing, objects, such as 31, which fall completely outside of the view volume were discarded from further processing ("trivial rejection"). Objects, such as 32, which fall entirely within the view volume remain unchanged and were sent directly to the rasterization subsystem ("trivial acceptance"). Objects, 33 and 34, that intersect the boundary of the view volume, however, required clipping against the view volume boundaries (also known as "clip planes"), such that those objects were split into multiple portions. Those portions of split or clipped objects which fall outside of the view volume were discarded, while the portions inside of the view volume were sent to the rasterizer. As is well known in the art, it is most advantageous to perform clipping on triangulated image components. With all vertices of the triangulated image lying in one plane, it is only necessary to know the vertices to perform clipping, without having to operate on each portion of the image volume lying within the vertices.

Figure 4:
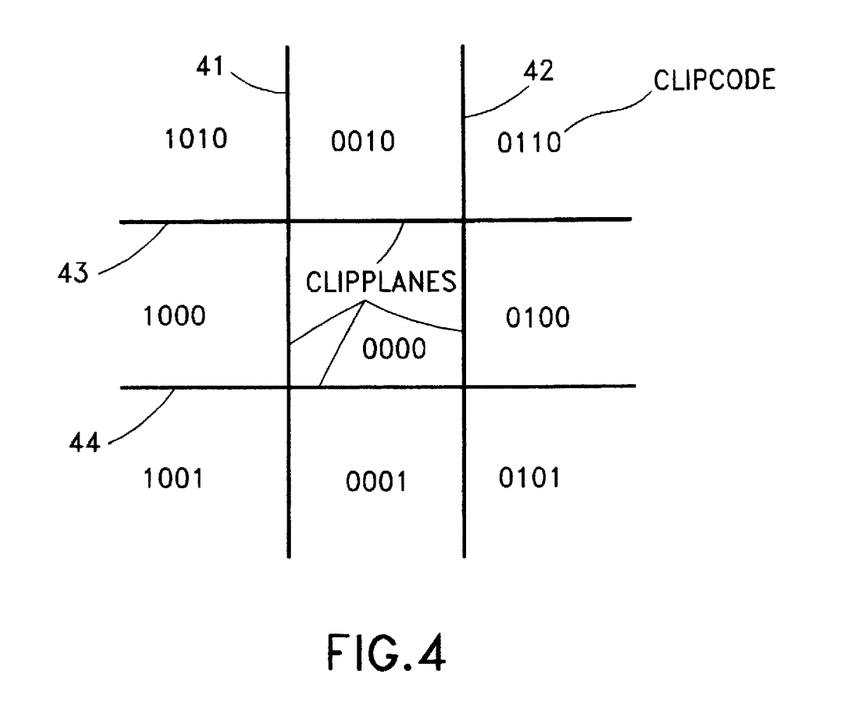
FIG. 4 shows a two-dimensional example of how clip codes are assigned to different regions formed by the clip planes.

Clip testing, (i.e., determining whether a triangle can be trivially accepted or rejected) is commonly performed using clip codes for the triangle vertices. Clip codes contain one OUT bit for each clipping plane. The OUT bit is set if the vertex is outside the clipping plane associated with that bit. FIG. 4 shows a two-dimensional example of how clip codes are assigned to different regions formed by the clip planes 41–44. A triangle can be trivially accepted if the bitwise OR of the outcodes of all vertices is 00 . . . 0. A triangle can be trivially rejected if the bitwise AND of the outcodes of all vertices is not 00 . . . 0.

Figures 5A, 5B:
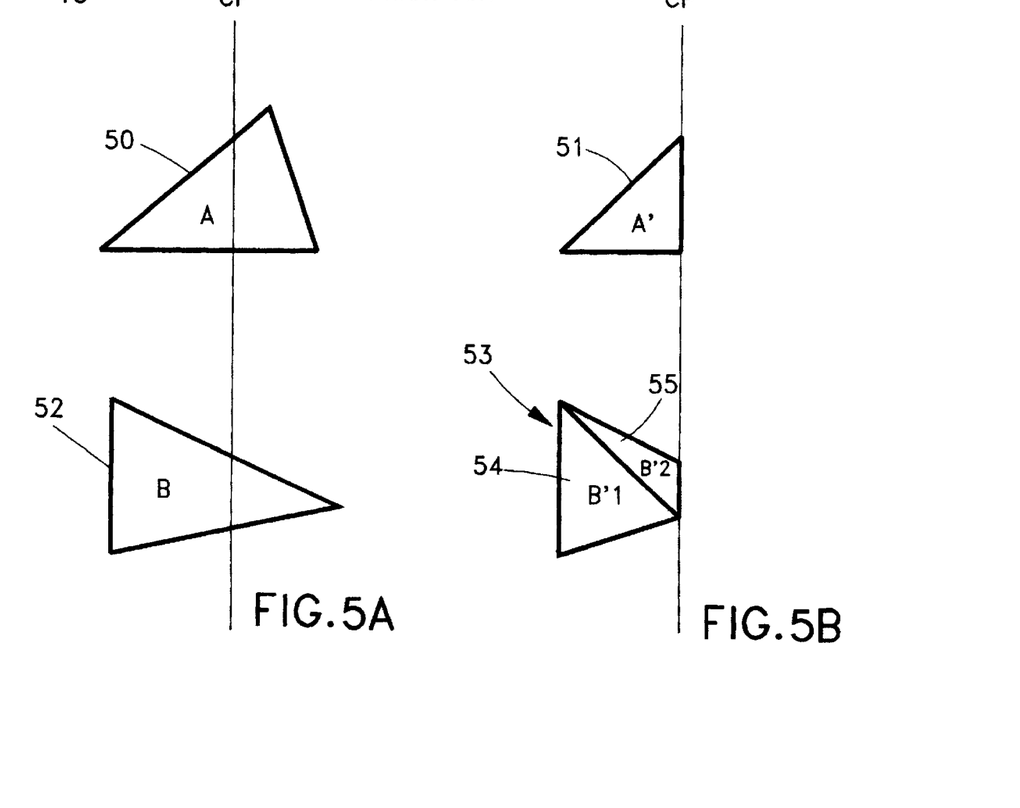
FIGS. 5A and 5B illustrate image objects before and after clipping along the illustrated clip plane.

If a triangle cannot be trivially accepted or rejected, it needs to be clipped against the clip planes. A technique frequently used is described in *Reentrant Polygon Clipping*, Suntherland and Hodgman, CACM, Vol. 17, pages 32–42, (1974). The triangle is clipped successively against each clip boundary. Clipping is performed by determining the intersection of the triangle edges with the boundary. The intersection points with the boundary form new vertices with the clipped triangle(s). If two vertices lie outside of the clipping boundary, only one triangle is produced by the clipping step, as shown for image 50 in FIG. 5A which is clipped to triangle 51 of FIG. 5B. If only one vertex is clipped by the clipping plane, such as is shown for triangle 52 of FIG. 5A, two vertices are produced by the clipping step, shown as polygon 53 of FIG. 5B. After the triangle has been clipped against all clipping planes, the resulting polygon is retriangulated. From the example, it can be well appreciated that clipping can produce a variable number of output vertices/triangles depending on the input data.

Figure 6:
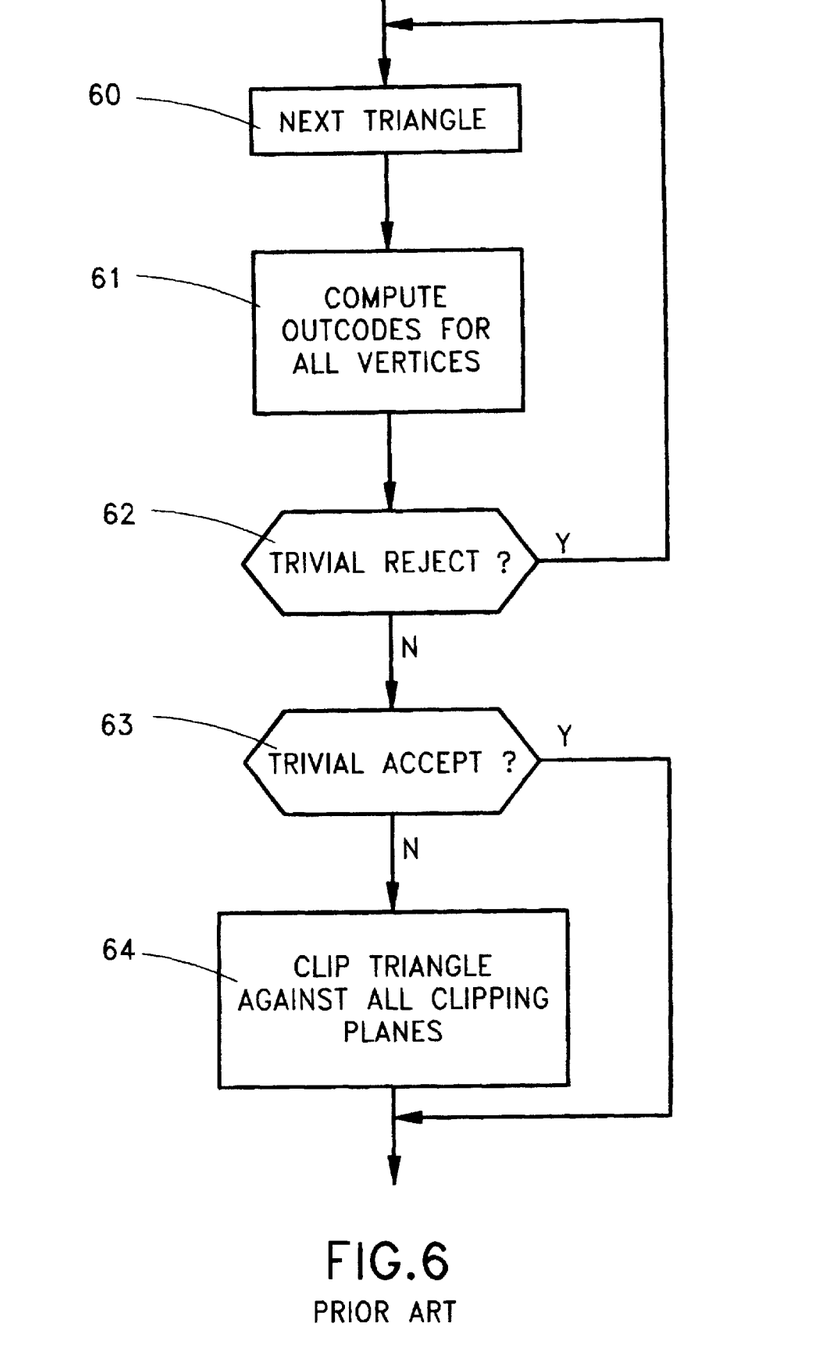
FIG. 6 shows a flow diagram describing the steps involved in clipping a triangle.

FIG. 6 shows a flow diagram describing the steps involved in clipping a triangle. The triangle is provided for processing at step 60, after which the outcodes are computed for all vertices of the triangle, at step 61. If the outcodes indicated that all vertices are outside of the clip planes, then the triangle is trivially rejected at step 62. If not trivially rejected, the determination is made at step 63 as to whether all outcodes are within all clip planes for trivial acceptance of the triangle. For any remaining triangles, clipping is performed at step 64 along a first clip plane, followed by clipping along each of the remaining planes.

As taught in the co-pending application, entitled "METHOD AND APPARATUS FOR CLIPPING CONVEX POLYGONS ON SINGLE INSTRUCTION MULTIPLE DATA COMPUTERS", Ser. No. 08/898,747, which is assigned to the present assignee, if one utilizes a single instruction multiple data (SIMD) computer where one set of instructions may be applied to different data in parallel by a plurality of computer engines, the outcode analysis (i.e., comparisons) may be run in parallel on more than one of the SIMD engines. Similarly, once it has been determined by the control processor that clipping is necessary, the computationally intensive clipping steps may be performed in more than one engine at a time. However, to shift from one set of instructions to another (e.g., from outcode assignment to clipping for a single triangle along one plane), requiring reformatting of the data, constitutes a significant interruption of the parallel data flow and results in unacceptable performance penalties. Since the shifting from outcode analysis instruction to clipping instruction may be repeated many times as the contents of an image are evaluated along the six clipping planes, the process becomes unduly long and complex.

Further, algorithms typically used to clip a polygon against a convex view volume usually contain several tests and conditional execution paths that are selected and executed depending upon the input. In software implementations of polygon clipping, these branches limit the throughput of the processing pipeline because of misses in the instruction cache and limited prefetching across branch points. Clipping performance on SIMD computers is further hampered by the sequential nature of the clipping process. Consequently, only a small number of parallel execution units are generally active concurrently for a given input data set.

In addition, the variable output length of the clipping process may result in different dynamic instruction lengths on different engines of the SIMD processor, resulting in bad utilization of some compute engines. Maximization of SIMD engine utilization for clipping convex polygons is addressed in the aforementioned co-pending application. What is further desirable, however, is a method for optimizing the processing prior to providing the polygons for clipping.

SUMMARY OF THE INVENTION

These and other objectives are realized by the present invention wherein most of the clipping steps are removed from the commonly executed graphics processing pipeline. The invention exploits the tendency of most polygons to be wholly inside of or wholly outside of the view volume. The Rasterization step is augmented whereby the rasterizer utilizes guardband regions about the clip volume, such that polygons requiring clipping (i.e., those that cannot be trivially rejected by the view volume and cannot be trivially accepted by the guardband region) occur only in rare circumstances. While executing the standard graphics processing steps, problem polygons (i.e., those outside of the guardband) are buffered for later processing, while the standard graphics processing continues, without the need for periodically reformatting data and performing clipping. After either a predefined number of polygons have been stored at the buffer location, or at such time as a change in the rendering state occurs, the buffered polygons are processed in batches, for example using SIMD processing for clipping edges in parallel, which is the subject of the aforementioned co-pending patent application. As will be apparent, the inventive process and apparatus are applicable for graphics processing by any computer system, and not only for those utilizing SIMD engines.

BRIEF DESCRIPTION OF THE DRAWINGS

The invention will now be described with specific reference to the appended drawings wherein.

DESCRIPTION OF THE PREFERRED EMBODIMENT

In accordance with one aspect of the present invention, the number of polygons requiring clipping is effectively reduced by the introduction and utilization of a guardband region about the periphery of the clip volume. Furthermore, and more significantly, those polygons which have been identified for clipping are buffered for later processing, thereby optimizing the graphics processing flow to the point at which clipping is conducted. In implementing the foregoing inventive process changes, several inventive modifications to standard graphics processing systems are required, as further detailed below.

Figure 7:
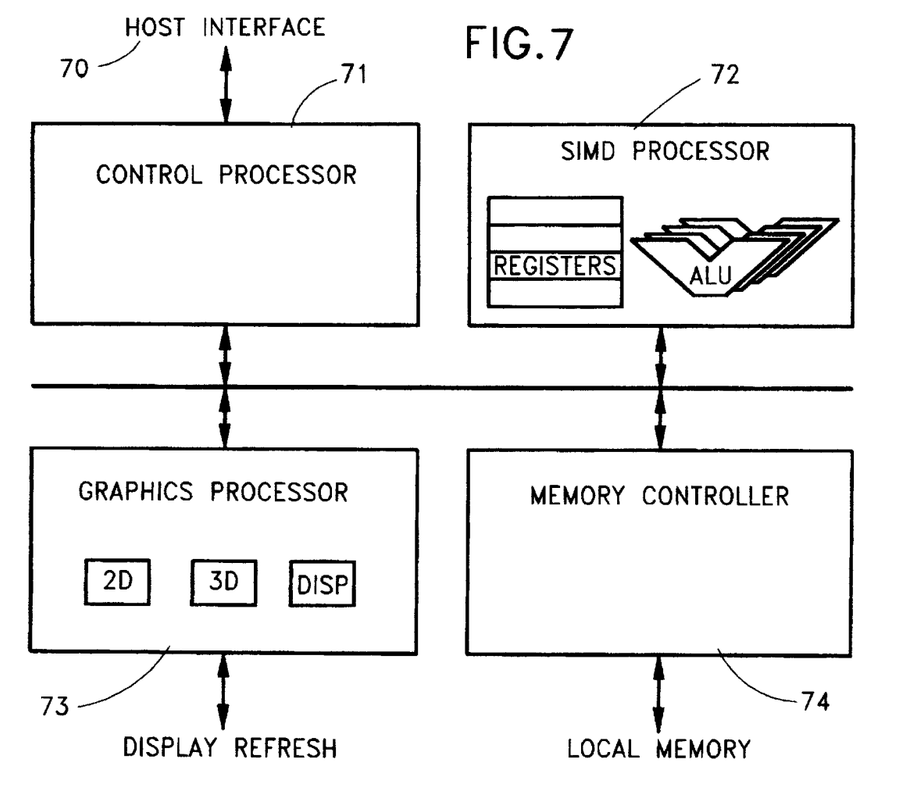
FIG. 7 provides a simplified view of the media processor architecture which is utilized for the present invention.

FIG. 7 provides a simplified view of a media processing system which will be utilized for the present invention. The illustrated system provides a conceptual system model which parallels several actual SIMD mediaprocessor implementations. It will be understood by one having skill in the art that the physical implementation may be different for both SIMD or other systems, depending upon the specific architecture chosen, but that the described functionality for each illustrated component must be provided. The Control Processor 71 is preferably chosen to support a standard set of scalar RISC instructions, augmented by special instructions to start or stop the SIMD engine, to synchronize execution of functions (e.g., wait, join, interrupt) of the Control Processor (hereinafter, "CTP") and the SIMD engine, and to control data exchange between those entities. The CTP is also responsible for external communication to the host processor interface 70.

The SIMD engine, 72, (hereinafter, "SE") contains n elements. In multiprocessor architectures, each element is represented by an individual processor. In vector processor architectures using long registers, an element is represented by each set of functional units and the register bits on which they operate. In either case, the SIMD element consists of a logical set of local registers and functional units, capable of operating on integer and floating point data types. All elements also have access to global data via shared memory, shared registers, or a broadcast facility. Common load/store and three-operand arithmetic/logical operations are available for all combinations of local and global data. Data dependent execution of code segments is facilitated either by masked execution, which disables write-back of results, or a conditional move instruction, which chooses between multiple source registers.

The Graphics Processor, 73 (hereinafter "GP"), is a fully-featured graphics subsystem which supports 2D and 3D rasterization, BitBlts, and screen refresh out of local memory. The rasterizer frontend has been specially designed to implement the invention, as further detailed with reference to FIG. 8. Finally, the mediaprocessor components connect to a local memory, 74, which can be accessed by the CTP, the SE, and the GP. The local memory holds data and instructions for the subsystems. Data stored in local memory for 3D rendering comprise vertex data, texture maps and z-buffer, along with the frame buffer for image storage and refresh. The memory controller (not shown) arbitrates access to local memory based upon a fixed priority scheme which ensures that screen refresh can proceed uninterrupted.

While the foregoing mediaprocessor system has been described as operating as a coprocessor to a host system, it is conceivable that the system be implemented such that the mediaprocessor is the only programmable processor (e.g., in a games console or set-top box). In either implementation, the vector processor will perform the matrix transformations, lighting calculations, and clip code computations for vertices. It is also conceivable that the invention be practiced on other computers that do not contain SIHD engines, as noted above.

What is referred to herein as the rendering pipeline is divided among three components of the graphics subsystem of FIG. 7. The CTP transfers one untransformed and unlit vertex to each element of the SE. The SE performs modeling, viewing, and perspective transformation as well as lighting and perspective division so that each element produces one lit vertex in screen space. The resulting vertices are then serialized and transferred to the graphics processor, GP, for assembly of the vertices into polygons. The rasterizer front-end tests a polygon's vertices against clip boundaries and either processes the polygon or places the polygon in a buffer for later clipping.

The parallel SIMD implementation of vertex transformation and lighting is straightforward and differs little from the conventional sequential algorithms. Each element holds one vertex including position and possible normal or color data, and has access to the global transformation and lighting parameters stored at the local memory. Geometry processing is executed as a single instruction stream on all elements by applying the global parameters to the local vertex. Since the foregoing processing excludes clipping, no data dependent branching is required. The few data dependent code segments are traversed by all elements yet executed conditionally.

Since the inventive process enables the pipeline to handle the most common and simple clipping cases immediately (namely the trivial accept and trivial reject cases), the more rare and complex cases are deferred for later processing. Trivial acceptance and trivial rejection are implemented by providing the rasterizer with the capability of discarding "reject" triangles or of rendering "accept" triangles without modification, as necessary.

Figure 8:
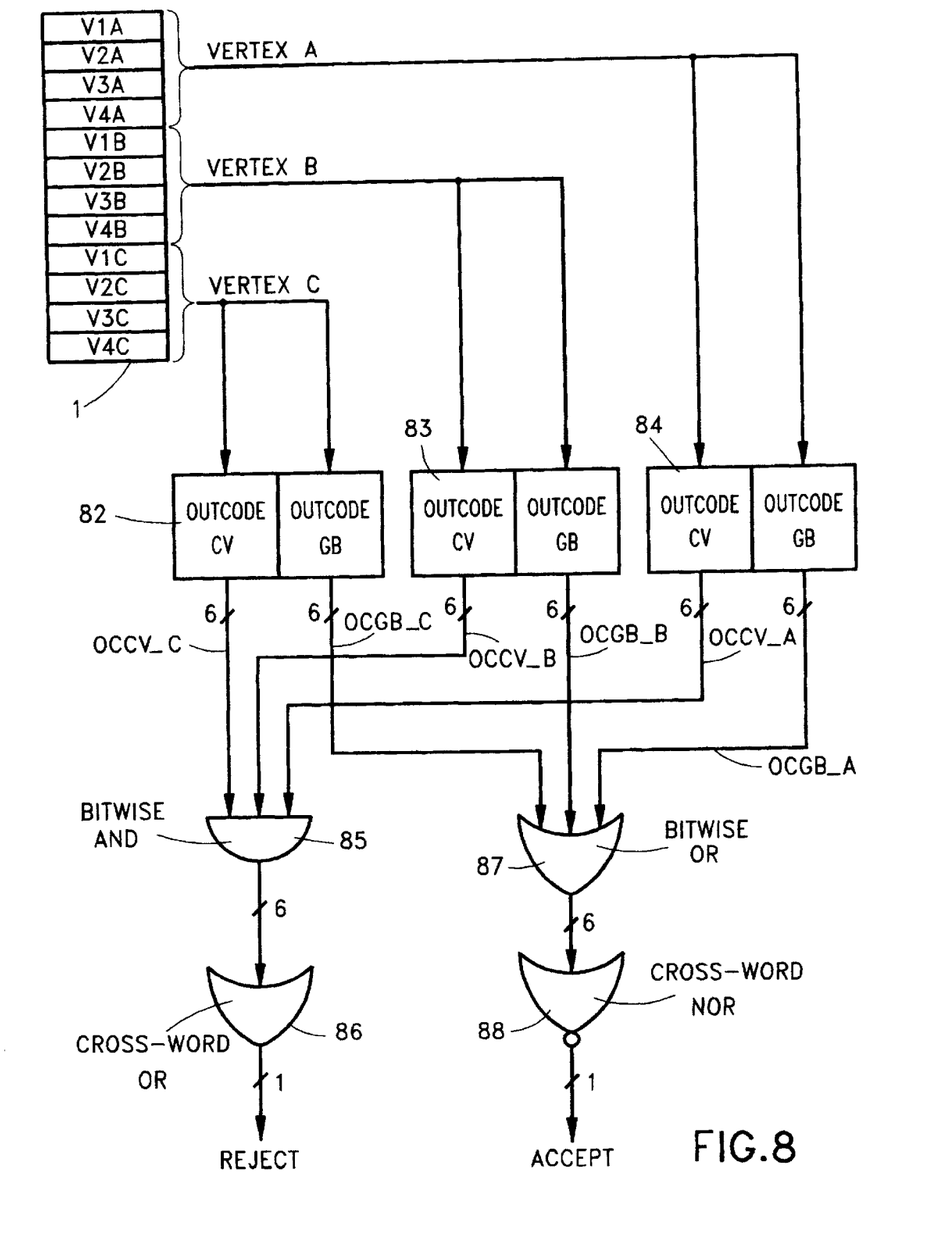
FIG. 8 provides representative architecture for a rasterizer front-end for use in accordance with the present invention.

FIG. 8 provides one possible implementation of the inventive rasterizer front-end. vertices are received at the Vertex Coordinate Register 81. For each value in Register 81, outcodes, or clip codes, are computed by comparison to the boundaries of the clip volume and the guardband, as shown at locations 82, 83 and 84. A Bitwise AND is applied to the clip volume outcodes at 85, followed by a Cross-word OR at 86 to determine if the triangle represented by those vertices can be trivially rejected. The guardband outcodes for the vertices undergo a Bitwise OR at 87, followed by a Cross-word NOR at 88 to determine if the triangle can be trivially accepted. Those triangles which can be neither trivially accepted nor trivially rejected are sent to the buffer for later clipping.

Figure 9:
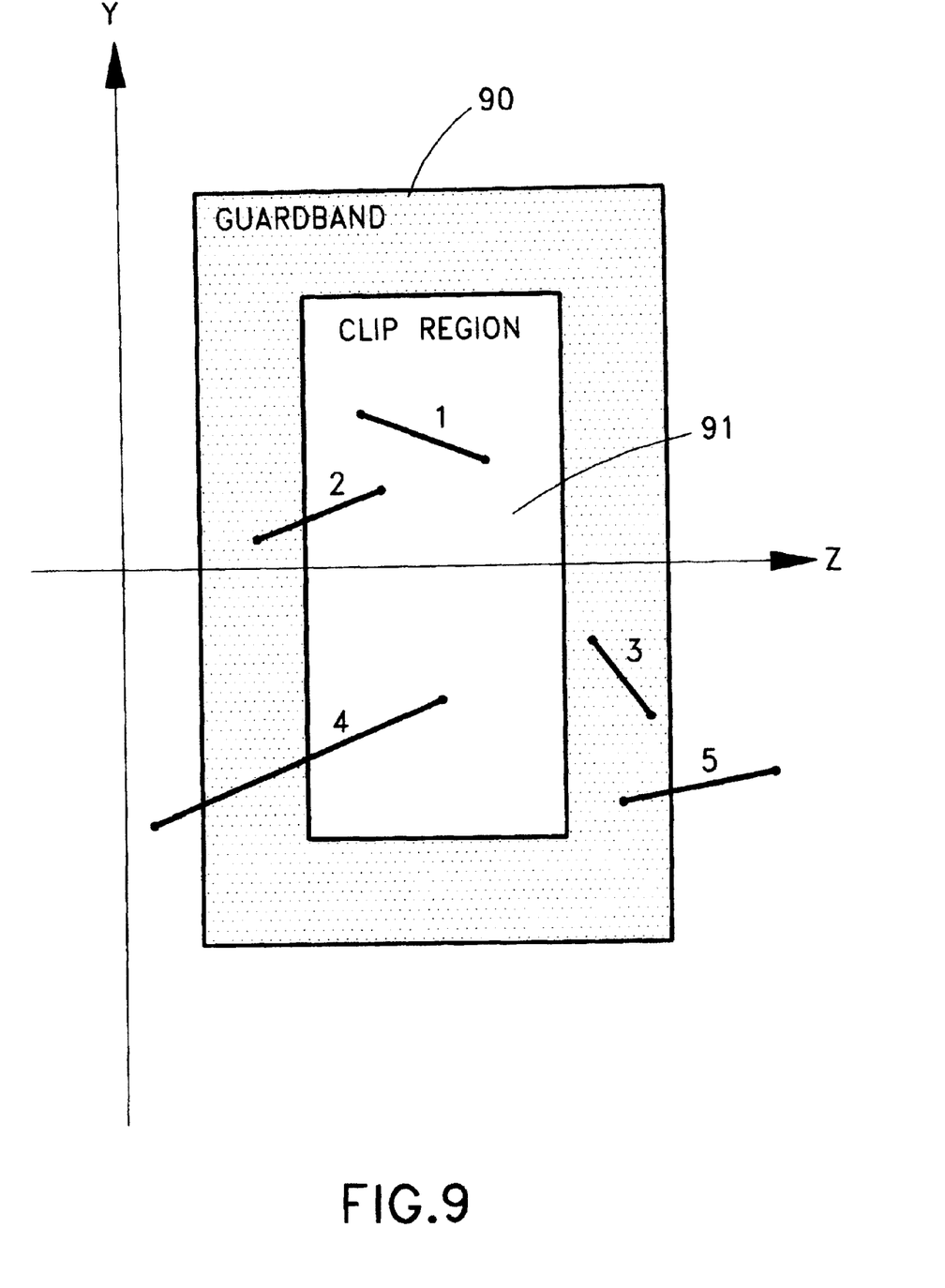
FIG. 9 illustrates guardband regions about the periphery of the clip volume for use in accordance with the present invention.

A guardband region, such as is illustrated at 90 in FIG. 9, is provided at the periphery of a 3D region, 91, representing the clip volume. The guardbands are introduced as a way to reduce the number of clipping operations and to increase the number of trivial accepts and rejects. All objects falling entirely inside of the guardband regions are trivially accepted. Objects that are entirely outside of at least one boundary of the clip region are trivially rejected. All other objects will require clipping against the clip region, and are sent by the rasterizer to a buffer for later clip processing. Two sets of outcodes must be computed, one for the clip region and one for the guardband region. The use of guardbands requires that the rasterizer can handle vertex coordinates that fall outside of the actual clip region.

The entire set of triangles in the clipping buffer is processed later, when one of the following conditions becomes true: the vertex list has been exhausted; the rasterizer state changes; or the clipping list exceeds a implementation-dependent preset length. With regard to the state of the rasterizer, the rasterizer has certain state information that affects how triangles are rendered (e.g., anti-aliasing, z-buffer comparison, active texture map, etc.). Clearly the state must be active when triangles that have been buffered and later clipped are sent to the rasterizer. If the state is not active when the triangle is sent to the buffer, that state information must have been stored with the triangle, or else the state will be lost and the triangles will be rendered incorrectly.

The following pseudo-code represents the inventive clipping task of the rasterizer, wherein the routines check_ta_bounds( ) and check_tr_bounds( ) compute the triangle outcodes for the guardband and the clip plane (or view volume) boundaries respectively:

```
{ Do
      trivial_accept=Check_ta_bounds (triangle);
      trivial_reject=Check_tr_bounds (triangle);
      If (trivial_accept)
         Render(triangle);
      Else
         if (trivial_reject)
            continue:
         else
            Add_to_cliplist (triangle);
} while (more_triangles AND no_state_change AND cliplist_not_full)
Send_to_SIMD_engine( cliplist )
```

Deferred clipping assumes that the order in which the objects are rendered is insignificant for the application. If the order in which triangles are rendered to the screen becomes important (e.g., for sequential display of data), the deferred clipping must be disabled, and the standard processing flow invoked.

The inventive clipping pre-determination on the part of the rasterizer requires that the rasterizer tests the vertices of a triangle against clipping boundaries and, based upon the test results, trivially accepts, trivially rejects or buffers the triangle for later processing. The outcode generation and analysis conducted in the context of perspective projection is detailed below:

The perspective transformation P is given by the matrix:

$$P = \begin{pmatrix} 1 & 1 & 0 & 0 \\ 0 & 1 & 0 & 0 \\ 0 & 0 & A & -AZ_n \\ 0 & 0 & 1/D & 0 \end{pmatrix} \quad \text{where } A = \frac{Z_f}{D(Z_f - Z_n)} \quad (1)$$

$Z_f$ denoted the position of the far clipping plane and $Z_n$ denotes the position of the near clipping plane. Transforming a point $(x,y,z,w)^T$ in WC to the homogenous point $(x_s, y_s, z_s, w_s)^T$ in PC results in the following:

$$\begin{pmatrix} x_s \\ y_s \\ z_s \\ w_s \end{pmatrix} = P \begin{pmatrix} x \\ y \\ z \\ w \end{pmatrix} \quad \begin{array}{c} x \\ y \\ A_z - wAZ_n \\ z/D \end{array} \quad (2)$$

The perspective division, as discussed above, transforms points from perspective coordinates into normalized device coordinates (NDC):

$$X_s = x_s/w_s$$

$$Y_s = y_s/w_s$$

$$Z_s = z_s/w_s. \quad (3)$$

Together, perspective transformation and division result in transforming the viewing fustrum into an axis-aligned parallelpiped. Although implementations rarely do, it is possible to compute the clipcodes in NDC by comparing vertices against the bounds of the parallelpiped as follows:

$$-1 < X_s < +1$$

$$-1 < Y_s < +1$$

$$0 < Z_s < +1. \quad (4)$$

More often, however, clipping is performed in perspective coordinates, due to the fact that a point is easily compared to a boundary in homogenous coordinates. Using the above-detailed equations, a point inside the fustrum satisfies the following conditions:

$$\begin{array}{ll} -w_s < x_s < w_s & +w_s < x_s < -w_s \\ -w_s < y_s < w_s \text{ for } w_s > 0 & +w_s < y_s < -w_s \text{ for } w_s < 0 \\ 0 < z_s < w_s & +w_s < z_s < 0. \end{array} \quad (5)$$

In either case, inequalities are used to compute in PC the vertex clip codes that indicate whether a vertex is inside of or outside of a given clip plane. Clip testing, as discussed above, (i.e, determining whether a triangle can be trivially accepted or trivially rejected) is commonly performed using these vertex clip codes. Clip codes contain one OUT bit for each clipping plane. The OUT bit is set if the vertex is outside of the clipping plane associated with that bit (i.e., if the respective inequality in. equation (4) or (5) is not true). If guardbands are used, a vertex must be compared against the guardband boundaries also. This operation is performed by the rasterizer in normalized device coordinates (hereinafter, NDC). Here subscripts GL, GR, GB, and GT denote left, right, bottom and top guardband boundaries, and GN and GF represent near and far z-direction boundaries:

$$X_{GL} < X_s < X_{GR}$$

$$Y_{GB} < Y_s < Y_{GT}$$

$$Z_{GH} < Z_s < Z_{GF}. \quad (6)$$

Preferably, the invention provides that a combination of the two approaches be utilized for clip code generation and analysis. Trivial accept and trivial reject determinations are performed at the end of the pipeline by the rasterizer, but the comparison against bounds may occur either in perspective space or in normalized device space, depending upon the representation of the vertex which has been sent to the rasterizer. For most cases, the SE sends vertex data in NDC and outcodes are generated with respect to the NDC boundaries. However, due to some special cases, explained below, such is not always possible. For those cases, the SE sends vertex data in perspective coordinates and outcodes are generated in the more common manner. The rasterizer can only rasterize vertices in NDC. Vertices in PC, at the rasterizer input, are always, by definition, outside of the view volume.

The computing of clip codes in screen space is complicated by two special cases: points near the eye and points behind the eye, areas I and II in FIG. 9. For those regions where the values for $Z_s/W_s$ may get infinitely large, it is not possible to provide accurate NDC coordinates to the rasterizer for the pre-clipping clip code computation step (although the rasterizer will require those real coordinates for pixel assignment) and it may be necessary to modify the coordinates so that they are recognizable by the rasterizer. Therefore, for regions I and II, the codes are set for the near clip plane, while in the other regions, NDC coordinates are provided for clip code generation and analysis. If in region I or II, the values are not divided by w and the z-value becomes negative. To illustrate, the device coordinate $Z_s$ from equations (2) and (3) is solved for below, taking into account the position of the eye and the near and far clipping planes and letting $B = Z_f/(Z_f - Z_n)$:

$$Z_s = \frac{z_s}{w_s} = B\left(1 - W\frac{Z_n}{z}\right)$$

As noted above, the division by z introduces problems for points near to the eye. As z approaches zero, Z approaches infinity. If the rasterizer uses a fixed point representation with lower precision than the SIMD engine, vertices near the eye may produce overflows. Additionally, the outcode inequality for $Z_s$ does not work for geometry behind the eye. Because the perspective projection maps points behind the eye to points in front of the eye, negative z values yield positive $Z_s$ values. The inequality for $Z_s$, however, expects vertices behind the eye to have negative $Z_s$ values, and would therefore fail for this special case.

Therefore, for vertices near and behind the eye, the vertices are left in perspective space. Perspective division for these special cases is disabled and the coordinates are presented to the rasterizer as perspective coordinates. The rasterizer can later distinguish between PC and NDC vertices with a simple sign check.

Figure 10:
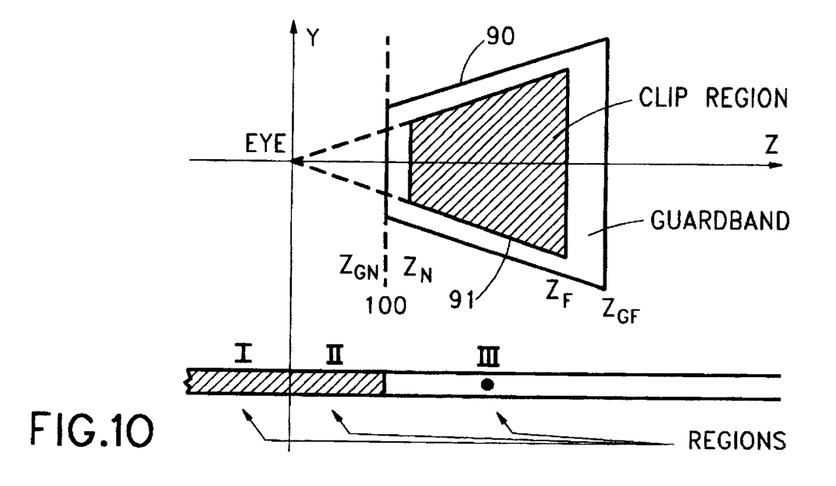
FIG. 10 provides a 2D graph representing areas relative to a viewing cone.

The encoding of vertices is done by first defining three regions in space with respect to z, see FIG. 10. Region I includes all points behind the eye; region II represents all near points in front of the eye which may cause overflow; and region III includes points in front of the eye which are safe from overflow. A boundary plane 100 separates the two regions in front of the eye. The plane is defined by the equation $z = Z_{min}$, where $Z_{min}$ is a z value that will not produce an overflow. If the rasterizer uses guardbands, then $Z_{min}$ is the boundary of the near z guardband. Otherwise, it is the near boundary of the view volume.

During Perspective Division or projection, the SIMD engine identifies the region in which a vertex lies and chooses a representation for the vertex (PC or NDC) appropriately. TO simplify the rasterizer's work, the SE forces all points behind the eye and in front of the near guardband plane to an homogeneous representation with w<0. As will be apparent from the foregoing, $w_s=z/D$ is always negative in region I and positive in region II. The SE therefore takes the homogeneous representation of region II vertices and negates all components of the coordinates. Due to the nature of homogeneous coordinates, this representation has a negative w value, but still represents the same vertex, because multiplication of all components by a constant inequality does not change the corresponding 3D coordinates [see, equation (3)].

Regardless of their true meaning, the coordinates are transferred to the rasterizer as the vector $(v_1, v_2, v_3, v_4)$. The pseudo-code is as follows:

```
If (z < Z_GM)                              //in region 1 or 2
    If (z < O)                             //in region 1
        v_1, v_2, v_3, v_4=x_s, y_s, z_s, w_s    //use PC
    Else                                   //in region 2
        v_1, v_2, v_3, v_4=-x_s, -y_s, -z_s, -w_s //use PC (negatives)
Else v_1, v_2, v_3, v_4=X_s, Y_s, Z_s, Q_s //use DC
Send (v_1, v_2, v_3, v_4);                 //send vertex to rasterizer
```

Table 1 lists the signs of $v_3$ and $v_4$ for each region. Note that since no two regions overlay, each vertex is presented to the rasterizer unambiguously.

TABLE 1

| REGION | $v_3=z_s$ or $Z_s$ | $v_4=w$ or $Q_s$ |
|---|---|---|
| I | − | − |
| II | + | − |
| III | − or + | + |

When the rasterizer receives a vertex vector from the SE, it differentiates between NDC and PC vertices by examining the sign of $v_4$. It then computes clip codes using the appropriate boundaries. Once the representation is known, many comparisons may become unnecessary. For instance, vertices in PC are in region I or II, behind or close to the near boundary, and thus ineligible for trivial acceptance.

The following rasterizer pseudo-code describes outcode generation in terms of the boundaries used:

```
If (v_4>0)         //in NDC: v_1, v_2, v_3, v_4=X_s, Y_s, Z_s, Q_s
//trivial reject checks
        -1 < v_1 < +1     // x boundaries
        -1 < v_2 < +1     // y boundaries
         0 < v_3 < +1     // z boundaries
//trivial accept checks
        X_GL < v_1 < X_GR  // x boundaries
        Y_GB < v_2 < Y_GT  // y boundaries
              v_3 < Z_GF   // far boundary
Else                   // in PC:v_1, v_2, v_3, v_4=x_s, y_s, z_s, w_s
//trivial accept impossible
//trivial reject checks - use inequalities for w < 0
        v_4 < v_1 < -v_4   // x boundaries
        v_4 < v_2 < -v_4   // y boundaries
                           // z_s < 0 implied
```

Figure 11:
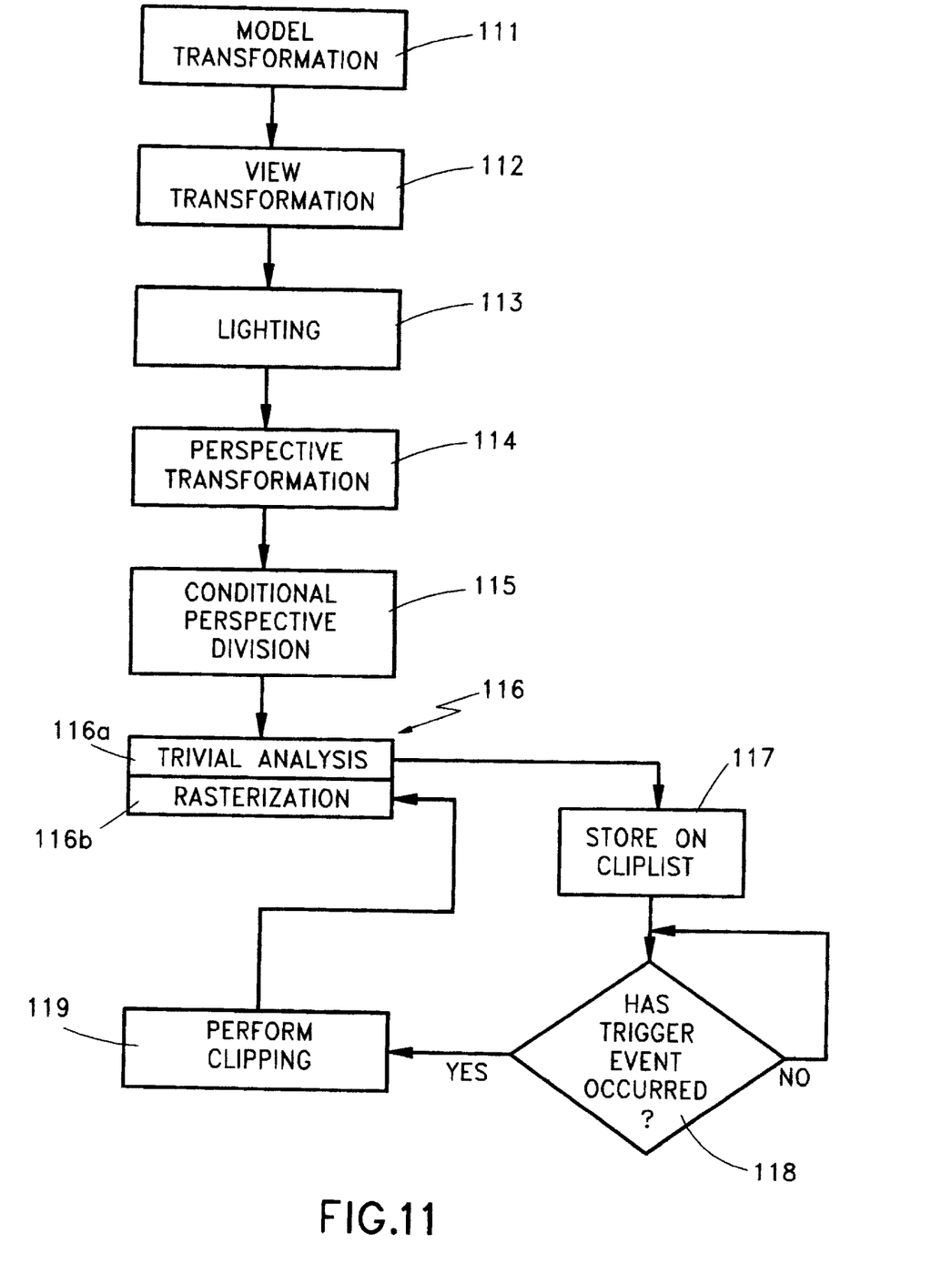
FIG. 11 provides a representative process flow for implementing the present invention.

FIG. 11 provides a representative process flow for graphics processing in accordance with the present invention. The original graphic information, described in model coordinates, is transformed into work coordinates in the Model Transformation Step 111, as in the past. At step 112, the world coordinates are further processed in the View Transformation step to render the image in eye coordinates. Lighting step 113 adds lighting and color to the coordinates, followed by the Perspective Transformation step 114 and Perspective Division step 115.

Figure 12:
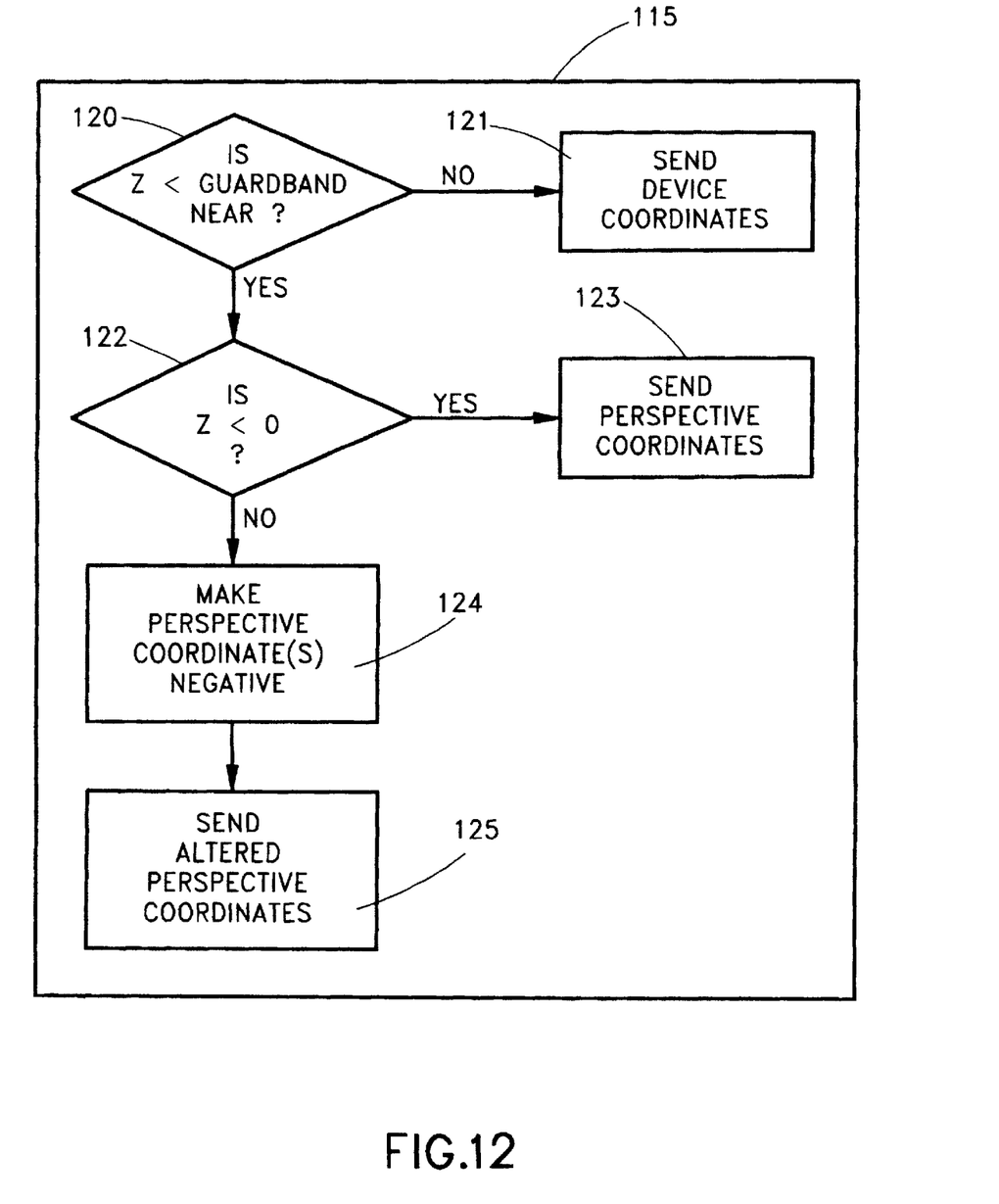
FIG. 12 provides process flow as a subset of the Perspective Division step in accordance with the present invention.

Within the Perspective Division step 115, before sending the coordinates of a clipped triangle back to the rasterizer, the SIMD engine must choose in which coordinates it should represent the triangle. As discussed above, the rasterizer cannot process coordinates from regions I and II if presented in NDC/homogeneous coordinates. Therefore, a determination is made as to how to represent the triangles based upon its z-coordinate. At decision box 120, a determination is made as to whether the vertex is in region I or II by deciding if the vertex z value is less than the z value for the near guardband region. If z is greater than the z value for the near guardband, then the device coordinates are returned at step 121. Next, at decision box 122, it is determined if the vertex is in region I by deciding if z<0. If z<0, then perspective coordinates are sent at step 123. If z>0, then the perspective coordinate w is presented as a negative value at step 124, and the perspective coordinates with the negative w value are sent at step 125.

After Perspective Division, an enhanced Rasterization Step 116 is performed whereby the trivial accept/reject determination is performed at 116(a). If any vertices are identified for clipping by step 116(a), they are deposited onto a ClipList at step 117. Those vertices which have been trivially accepted at 116(a) then pass to step 116(b) for rasterization/pixel assignment. From the ClipList, vertices will undergo clipping upon the occurrence of an implementation-dependent preset event, as discussed above. A determination is made at decision box 118 as to whether the event has occurred. If the determination is "no," the processing continues without interruption. If, however, the determination is "yes," the process flow is interrupted and step 119, Clipping, is conducted, after which the clipped vertices are returned to the rasterizer for rasterization at step 116(b).

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A graphics processing system comprising:
   rendering means for receiving graphics information and rendering polygons from said graphics information; and
   rasterizer means for assigning pixels to said polygons, wherein said rasterizer means is adapted to determine whether each of said polygons comprises one of a first plurality of polygons not requiring clipping and a second plurality of polygons requiring clipping against at least one clip plane prior to said pixel assigning and for deferring clipping of at least one of said polygons requiring clipping until after detection of a trigger event.

2. The system of claim 1 wherein said rasterizer means is adapted to determine whether polygons require clipping comprises means to compute clip codes for said polygons and means for comparing the vertex coordinates of said polygons to said at least one clip plane.

3. The system of claim 1 further comprising means for storing polygons requiring clipping based upon said comparing.

4. The system of claim 1 further comprising clipping means for performing clipping on said polygons requiring clipping and for rendering clipped polygons.

5. The system of claim 4 wherein said clipping means is further adapted to provide said clipped polygons to said rasterizer for pixel assignment.

6. The system of claim 4 further comprising means for activating said clipping means upon detection of a trigger event.

7. The system of claim 1 wherein said means for rendering polygons comprises means for converting the coordinates of the vertices of said polygons into one of a plurality of representations of coordinates.

8. The system of claim 7 further comprising means for determining the location of each of said vertices and for selecting one of said plurality of representations of coordinates based upon said determining.

9. A method for processing graphics from graphics information comprising the steps of:
rendering polygons from said graphics information; and
rasterizing said polygons by assigning pixels to said polygons, wherein said rasterizing additionally comprises the steps of:
determining whether each of said polygons comprises one of a first plurality of polygons not requiring clipping and a second plurality of polygons requiring clipping against at least one clip plane prior to said pixel assigning;
assigning pixels to at least one of said polygons not requiring clipping; and
deferring clipping and assigning pixels for at least one of said polygons requiring clipping until after detection of a trigger event.

10. The method of claim 9 wherein said determining comprises computing clip codes for said polygons by comparing the vertices of said polygons to said at least one clip plane.

11. The method of claim 9 further comprising the step of storing polygons requiring clipping based upon said comparing.

12. The method of claim 9 further comprising the steps of performing clipping on said polygons requiring clipping; and
rendering clipped polygons.

13. The method of claim 12 wherein said clipping further comprises providing said clipped polygons to said rasterizer for pixel assignment.

14. The method of claim 11 further comprising the step of activating said clipping means upon detection of a trigger event.

15. The method of claim 14 wherein said rasterizing further comprises maintaining at least one state controlling said steps and wherein said detection of a trigger event comprises detecting a change in said state.

16. The method of claim 14 wherein said detection of a trigger event comprises determining that rasterizing of all of said polygons, other than said polygons requiring clipping, has been completed.

17. The method of claim 14 wherein said detection of a trigger event comprises determining that a preset number of polygons requiring clipping has been stored.

18. The method of claim 9 wherein said rendering polygons comprises converting said polygons into one of a plurality of representations of coordinates.

19. The method of claim 18 further comprising the steps of:
determining the location of each of said polygons; and
selecting one of said plurality of representations of coordinates based upon said determining.

20. A method for processing graphics presented in model coordinates comprising the steps of:
converting said model coordinates into world coordinates;
converting said world coordinates into eye coordinates;
applying lighting and color to said eye coordinates;
transforming said eye coordinates into a normalized view volume;
mapping said normalized view volume into polygons in device coordinates;
rasterizing comprising the steps of:
determining if clipping of polygons is required; and
responsive to said determining, storing polygons requiring clipping and assigning pixels to polygons not requiring clipping; and
performing deferred clipping on at least one of said polygons requiring clipping until said assigning of pixels is complete for at least one of said polygons not requiring clipping.

21. The method of claim 20 wherein said performing deferred clipping comprising the steps of:
clipping of said stored polygons; and
rasterizing said clipped polygons.

22. The method of claim 21 wherein said performing deferred clipping further comprises:
detecting a trigger event; and
performing clipping upon detection of said trigger event.

23. The method of claim 22 wherein said detecting of a trigger event comprises accruing a predetermined number of stored polygons for clipping.

24. The method of claim 22 where said detecting of a trigger event comprises completing rasterization of all polygons not requiring clipping.

25. The method of claim 22 wherein said rasterizing further comprises maintaining at least one state controlling said steps and wherein said detecting of a trigger event comprises detecting a change in said state.

26. The method of claim 21 further comprising analyzing the location of the vertices of said polygons along the z-direction prior to rasterizing.

27. The method of claim 26 wherein said analyzing the location of the vertices of said polygon along the z-direction comprises:
comparing said location to at least one preset z value.

28. The method of claim 27 wherein said comparing comprises:
determining if said location is less that said at least one preset z value; and
making the w value of said vertex value negative if said determining indicates that said location is less than said at least one preset z value.

29. In a graphics processing process comprising rendering a plurality of polygons from said graphics and converting said plurality of polygons to pixels, wherein at least one of said plurality of polygons requires clipping prior to generating pixels for display and at least one other of said plurality of polygons does not require clipping, the improvement comprising:
deferring clipping of said at least one polygon until rendering and conversion are completed for at least one of said other polygons.

30. The improvement of claim 29 wherein said deferring comprises waiting to perform clipping until a predetermined event occurs.

31. The improvement of claim 30 wherein said deferring comprises waiting to perform clipping until all of said other polygons have been rendered and converted.

32. The improvement of claim 30 wherein said deferring comprises waiting to perform clipping until a fixed number of polygons require clipping.

33. The improvement of claim 30 wherein said graphics processing process further comprises maintaining at least one state controlling said process and wherein said deferring comprises waiting to perform clipping until detection of a change in said state.

* * * * *